United States Patent Office 3,304,339
Patented Feb. 14, 1967

3,304,339
CONVERSION OF ALKYL AROMATICS
Hans A. Benesi, Berkeley, Calif., assignor to Shell Oil Company, New York, N.Y., a corporation of Delaware
No Drawing. Filed Feb. 25, 1966, Ser. No. 529,949
6 Claims. (Cl. 260—668)

This application is a continuation-in-part of application Serial No. 318,833, filed October 25, 1963, now abandoned.

This invention relates to a process for the catalytic conversion of alkyl aromatic hydrocarbons and relates more particularly to a process for the isomerization of xylenes.

The catalytic isomerization of xylenes and similar low molecular weight alkyl benzenes is known. For example, aluminum chloride promoted with hydrogen chloride was a very early catalyst suggested for this isomerization reaction. Subsequently, other catalysts such as a Group VIII metal supported on a refractory oxide support have been proposed for the isomerization of xylenes. See, for example, U.S. Patent 2,976,332 to Leum et al.

In general, previously suggested catalysts have a disadvantage such as one or more of the following: (1) the catalyst is expensive, (2) the catalyst is insufficiently active to be used in a commercial process, (3) the catalyst is sufficiently active, but ultimate life is too short to be of commercial interest, or (4) the catalyst has poor selectivity for the isomerization reaction, i.e., the catalyst promotes side reactions such as cracking and hydrogenation which produce coke and gases and/or reduce the yield of isomerized aromatics.

It has now been found that alkyl aromatices such as xylenes can be isomerized at an elevated temperature by means of a catalyst comprising silver and fluoride composited with acid-acting refractory oxide cracking catalyst. In accordance with one embodiment of the invention, xylene is contacted with a catalyst comprising silver and fluoride composited with silica-alumina in the presence of hydrogen at a temperature in the range from about 400° to 900° F. The silver catalyst is more highly active than a similar catalyst comprising, for example, copper.

The predominant portion of the catalyst is an acid-acting refractory oxide which is generally referred to as the base for the catalyst. A strongly acidic base such as silica-alumina comprising about 60 to 90% by weight silica gives excellent results. Silica-alumina is generally known as primarily an amorphous material and is to be distinguished from the crystalline alumino-silicates such as faujasite and mordenite. Silica-alumina and its preparation is well known in the art. (See chapter 1 by Ryland et al. in Cataysis VII, Emmett, 1960, Reinhold Publishing Co.) If desired, other cracking catalysts such as silica-alumina-magnesia, silica-titania, silica-titania - zirconia and the like may be used. In certain cases, alumnia, rendered acidic by the addition of halogen or alumina-boria may be used.

The silver and the fluoride can be composited with the siliceous cracking base in any suitable manner, such as by impregnation, ion-exchange, or the like. The amount of silver in the catalyst can vary over a broad range and is from about 0.1 to 20% by weight, expressed as elemental metal. Preferably, the amount of silver is in the range from about 1 to 10% by weight. The amount of fluoride in the catalyst is in the range from about 0.1 to 5% and preferably from about 1 to 4% by weight. A highly active and suitable catalyst contains about 3 to 8% w. silver, and about 1 to 3% w. fluoride on a silica-alumina cracking catalyst base of about 10–30% w. alumina, the silver being ion-exchanged into the base.

Feed to the process of the invention can be a substantially pure xylene isomer, a mixture of xylene isomers, or a hydrocarbon fraction rich in xylene isomers. For example, a source of xylene isomers is the $C_8$ aromatic fraction recovered from catalytic reformates or coal tars. The xylene fraction remaining after separating and recovering all or a part of a given isomer from such a source is a suitable feed for the process of the invention. Thus, para-xylene, which is of growing importance, can be recovered from a $C_8$ catalytic reformate fraction by low temperature crystallization. The mother liquor produced from such low temperature crystallization is deficient in para-xylene with respect to the thermodynamic equilibrium concentration of xylene isomers and is an excellent feed to the present process. Moreover, catalytic reformates contain appreciable quantities of ethylbenzene which is difficult to remove from the xylene. In the present process, the ethylbenzene undergoes appreciable conversion to other hydrocarbons, especially disproportionation products, which can be removed. This is advantageous for on separation of the $C_8$ product into one or more xylene isomers, e.g., by crystallization, and return of the residue $C_8$ hydrocarbons, there is less tendency for a buildup of ethylbenzene in the system.

The process of the invention is carried out at a temperature in the range from about 400° to 900° F. and preferably from about 482° to 752° F. In general, higher conversions are obtained as temperature is increased.

The isomerization reaction can be conducted over a wide range of space velocities, such as a space velocity in the range from about 0.5 to 25, but is preferably at a space velocity in the range from about 1 to 10. In general, conversion decreases with an increase in space velocity, although selectivity is generally increased. Space velocity, as the term is used herein, refers to WHSV and is expressed as weight of feed per hour per unit weight of catalyst.

The isomerization reaction is carried out in the presence of hydrogen; however, there is little or no net consumption of hydrogen in the process. Any consumption of hydrogen is the result of side reactions, such as hydrogenation of the aromatics and it is preferred to keep such reactions to a minimum. The presence of hydrogen functions to improve catalyst life, apparently by preventing polymerization of intermediate reaction products which would otherwise polymerize and deposit on the catalyst. Hydrogen apparently also functions to improve conversion and selectivity for the isomerization reaction. A hydrogen to hydrocarbon mole ratio of from about 1:1 to 25:1 or higher and preferably from about 5:1 to 15:1 is used. It is not necessary to employ pure hydrogen, since hydrogen-containing gases, e.g., hydrogen-rich gas from the catalytic reforming of naphthas, are suitable. Total pressure can be in the range from about atmospheric to about 1500 p.s.i.g. and preferably from about 100 to 1000 p.s.i. For a given space velocity, as pressure is increased, actual residence time is increased which tends to increase conversion.

In the present process, as in any known xylene isomerization process, the reaction zone effluent contains a mixture of the three xylene isomers even when the feed is a single isomer or a mixture of two isomers. To obtain a specific xylene isomer, the isomerization product is recovered and subjected to a suitable separation such as the use of low temperature crystallization, the use of complexing agents, and the like. Such separation processes are well known and as they are not a part of the isomerization process of the invention, a description of separation methods is unnecessary.

Example I

Silica-alumina powder (American Cyanamid MS–A–3 cracking catalyst of approximately 25% w. alumina) was formed into granules and composited with silver and and fluorine. The granules were contacted with an ammoniacal solution of $NH_4HF_2$ and $AgNO_3$ followed by washing, drying and calcining at 1022° F. (550° C.) for 16 hours. The final catalyst contained 5.7% w. Ag and 1.5% w. F.

This catalyst was tested for the isomerization of o-xylene at 572° F. (300° C.), 1000 p.s.i.g., 26/1 $H_2$/oil mol ratio, and 8 WHSV (weight hourly space velocity). Results are given in Table I.

TABLE I

| | |
|---|---|
| Conversion, percent w. | 61.8 |
| Products, percent w.: | |
| $<C_6$ paraffins | 0.2 |
| Benzene | 0.4 |
| Toluene | 5.1 |
| o-Xylene | 38.2 |
| m-Xylene–p-xylene | 50.1 |
| Trimethylbenzenes | 6.0 |
| Tetramethylbenzenes | 0.1 |

Example II

A series of catalysts were prepared using the silica-alumina powder of Example I as a support. The silica-alumina was contacted with an ammoniacal solution of ammonium bifluoride and metal [$Ag^+$, $Ni^{++}$, and $Pt(NH_3)_4^{++}$] in the form of nitrates (except for the platinum where the chloride was used), followed by washing, drying at 248° F. (120° C.), and calcining in air at 1022° F. (550° C.) for 16 hours.

The various catalysts were tested for the isomerization of o-xylene at 572° F. (300° C.), 1000 p.s.i.g., 26/1 $H_2$/oil mole ratio, and 8 WHSV, except for silica-alumina alone which was tested at 4 WHSV. Results are given in Table II.

TABLE II

| | Silica-alumina | 2.5% w. F Silica-alumina | 10.1% w. Ag Silica-alumina | 5.0% Ni/0.2% F Silica-alumina | 0.4% Pt, 0.3% w. F Silica-alumina |
|---|---|---|---|---|---|
| Conversion, percent w | 6.2 | 6.2 | 12.4 | 100 | 100 |
| Products, percent w.: | | | | | |
| $<C_6$ paraffins | 0.1 | <0.1 | 0.1 | | |
| Benzene | 0.1 | 0.2 | 0.2 | | |
| Toluene | 0.2 | 0.2 | 0.2 | | |
| o-Xylene | 93.8 | 93.8 | 86.6 | | |
| m-Xylene–p-xylene | 5.3 | 5.5 | 11.6 | | |
| Trimethylbenzenes | 0.3 | 0.3 | 0.2 | | |
| Tetramethylbenzenes | 0.2 | 0.0 | 0.1 | | |
| Hydrogenated $C_8$'s | 0.0 | 0.0 | 0.0 | 100 | 100 |

From the above results it can be seen that little isomerization of o-xylene is effected under these conditions. Nickel or platinum (which have strong hydrogenation activity) on fluorided silica-alumina is not selective for isomerization at these conditions as the o-xylene is completely hydrogenated rather than isomerized. It should be noted that platinum catalysts are more advantageously employed at relatively high temperatures and low pressure, e.g., about 842° F. (450° C.) and 150–300 p.s.i., which favors a low equilibrium concentration of naphthenes. However, under such conditions, undesirable side reactions are usually encountered.

Example III

A copper catalyst containing 7.5% w. Cu and 0.3% w. F was prepared with the silica-alumina cracking catalyst in the manner described in Example II. This catalyst was tested for the isomerization of o-xylene at 662° F. (350° C.), 1000 p.s.i.g., 26/1 $H_2$/oil mole ratio, and 8 WHSV. Conversion of o-xylene was only 25.9% w., even at the somewhat higher temperature, with the product containing 24.2% w. m- and p-xylene.

Example IV

The silver catalyst of Example I was tested for the conversion of a $C_8$ mixture containing 20.1% ethylbenzene and 79.6% w. o-xylene. The conversion was carried out at 572° F. (300° C.), 1000 p.s.i.g., 26/1 $H_2$/oil mole ratio and 8 WHSV.

For comparison, a silver catalyst having a crystalline alumino-silicate as the support was tested under the same conditions. The catalyst was prepared from the sodium form of mordenite (Zeolon from the Norton Co.) which was first washed with ammonium nitrate to replace sodium ions with ammonium ions. Silver ions from a silver nitrate solution were then exchanged into the ammonium mordenite, and the catalyst was washed, dried, and calcined at 1022° F. (550° C.). The final catalyst contained 4.7% w. Ag.

Results of the tests are given in Table III, catalyst A and B being the silica-alumina and mordenite catalyst, respectively.

TABLE III

| | A | B |
|---|---|---|
| o-Xylene conversion, percent w | 71.6 | 34.9 |
| Ethylbenzene conversion, percent w | 42.3 | 3.5 |
| Products, percent w.: | | |
| $C_2$ through $C_5$ paraffins | 0.5 | 0.1 |
| Benzene | 3.9 | 0.8 |
| Toluene | 7.4 | 0.5 |
| Ethylbenzene | 91.6 | 19.4 |
| o-Xylene | 22.6 | 41.8 |
| m-Xylene–p-xylene | 40.9 | 25.4 |
| $C_9$ and $C_{10}$ alkylbenzenes | 13.1 | 1.9 |

From the above results, the high conversion of both xylene and ethylbenzene are obtained with silver on fluorided silica-alumina.

I claim as my invention:

1. A process for isomerizing a xylene isomer which comprises contacting said isomer in the presence of hydrogen in an isomerization zone at a temperature in the range from about 200 to 500° C. with a catalyst comprising silver and fluoride composited with an acid-acting cracking catalyst.

2. The process according to claim 1 wherein the catalyst comprises from about 0.1% to 20% by weight silver and from about 0.1% to 5% by weight fluoride composited with silica-alumina.

3. The process according to claim 1 wherein the isomerization is carried out at a pressure in the range from about atmospheric to about 1500 pounds per square inch.

4. The process according to claim 1 wherein the xylene isomer is in admixture with ethylbenzene and a $C_8$ fraction comprising xylenes and ethylbenzenes is recovered from the effluent from the isomerization zone.

5. The process according to claim 4 wherein a xylene isomer is separated from the $C_8$ fraction and remaining $C_8$ hydrocarbons are recycled to the isomerization zone.

6. The process according to claim 5 wherein the catalyst comprises from about 0.1% to 20% by weight silver and about 0.1% to 5% by weight fluoride composited with silica-alumina.

References Cited by the Examiner

FOREIGN PATENTS 744,467    2/1956    Great Britain.

DELBERT E. GANTZ, *Primary Examiner.*

C. R. DAVIS, *Assistant Examiner.*